3,528,727
METHOD AND APPARATUS FOR FOCUSING A BEAM OF LIGHT WITH A CONTROLLED VORTEX FLOW OF FLUID
Robert B. Halliday, Chenango Forks, N.Y., assignor to Singer - General Precision, Inc., a corporation of Delaware
Filed Apr. 25, 1966, Ser. No. 544,864
Int. Cl. G02b 3/14
U.S. Cl. 350—180                                9 Claims

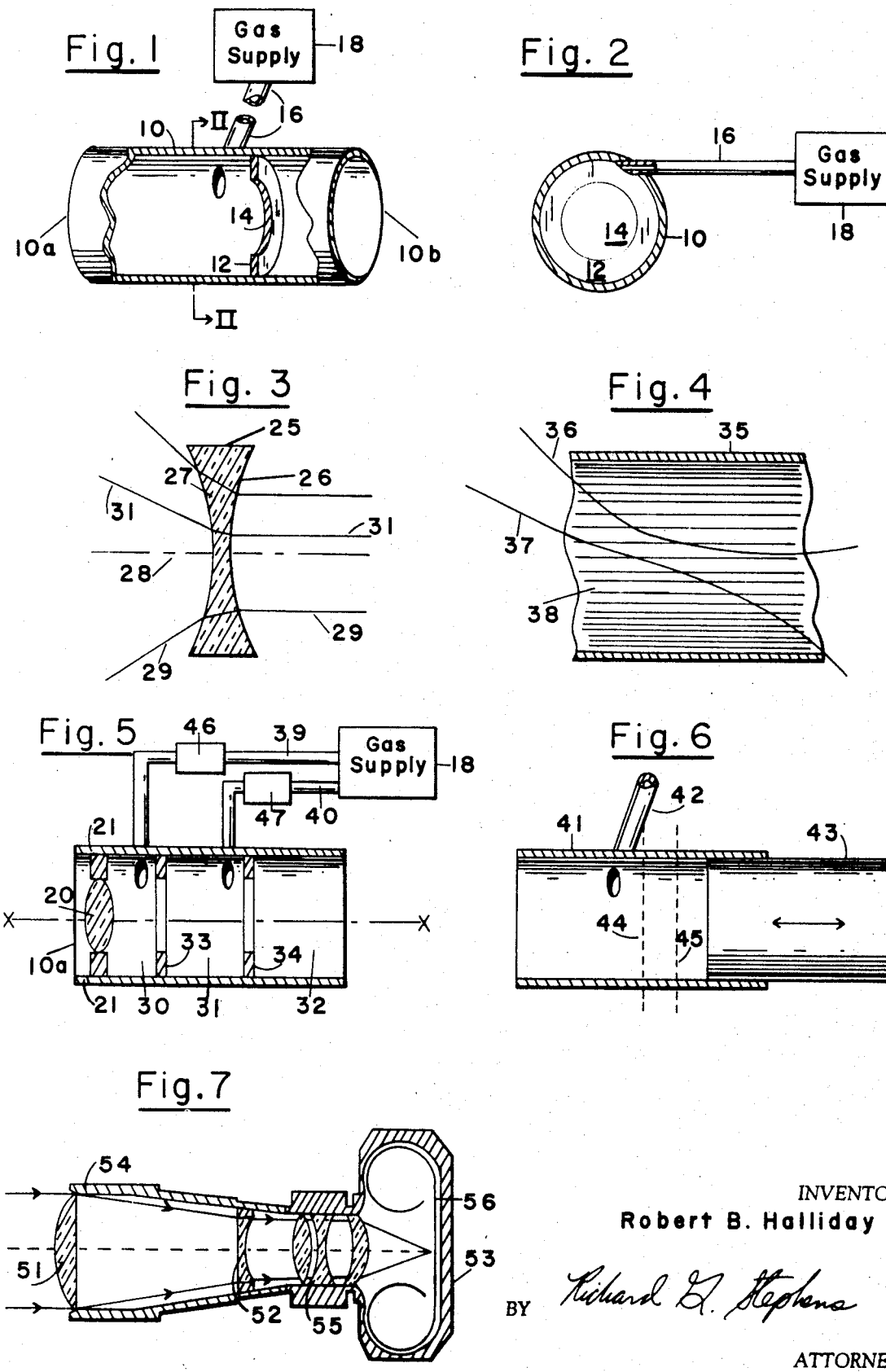
Sept. 15, 1970 — R. B. HALLIDAY — 3,528,727
METHOD AND APPARATUS FOR FOCUSING A BEAM OF LIGHT WITH A CONTROLLED VORTEX FLOW OF FLUID
Filed April 25, 1966
INVENTOR
Robert B. Halliday
BY Richard G. Stephens
ATTORNEY United States Patent Office 3,528,727
Patented Sept. 15, 1970

ABSTRACT OF THE DISCLOSURE

A novel method and apparatus for focusing light beams by creating in a transparent gas a density gradient, and thereby a refractive index gradient, symmetrical about an axis along which the beam is directed. Means for creating the density gradient include vortex flow of the gas within a hollow tube, thereby making possible the use of a single gas or homogeneous gas mixture. Further refinements include means for selectively changing the refractive index gradient, and thereby the focusing power of the lens, means for creating a number of axially spaced areas of refractive index gradients, and means for selectively changing the longitudinal position of the area of refractive index gradient relative to the length of the tube within which it is contained.

---

This invention relates to optical methods and apparatus, and more particularly, to improved optical methods and apparatus employing optical elements formed by the manipulation and control of fluids.

Most prior art optical systems employ lenses formed by clear solids such as glass, and, in general, it is virtually impossible to change the shape and the optical effect of such lenses. Other known optical systems employ deformable solids as variable reflectors, but most, if not all, of these systems require complex mechanical apparatus to deform the reflectors physically. Another class of variable optical elements employs bodies of liquids which are changed in shape in various ways to provide variable lenses. Some of these prior art systems are not suited for certain applications because they are reflective rather than transmissive. In addition, some prior art transmissive systems are not suitable because desired indices of refraction are not obtained very easily. As far as is known, the prior art has been unable to provide a useful transmissive optical lens in which the shape, or the power, or the focal length of the lens could be varied without complex mechanical equipment.

The method of the present invention utilizes the creation of a variable density gradient in a clear, compressible fluid to develop a selectively controlled variation in the index of refraction in the fluid so as to provide the equivalent of an optical lens. Assume a transparent, compressible fluid injected tangentially into a tube having open ends. A vortex-like rotary flow will be established within the tube, with the fluid molecules traveling in helical paths out the ends of the tubes. For the purposes of the present discussion, the axial motion of the fluid toward the open ends of the tube may be ignored. Looking at the rotary fluid motion in cross-section, it can be observed that there are several different types of gas flow across the diameter of the tube. The outer region, adjacent the wall of the tube, comprises a boundary layer wherein the gas flow is quite complex and includes substantial turbulence. Just inside the boundary layer region, the fluid flow resembles simple vortex flow (in which viscosity is considered to be constant), so that within this second region, the linear velocity is inversely proportional to radial distance. A third, transition region exists between the second region and a core, or region adjacent the center of the tube. Near the center of the tube, viscosity effects predominant to provide what is often termed "wheel-type" flow, wherein the velocity of the fluid is directly proportional to the radial distance from the center of the tube. The fluid flow in the third, or transition, region between the simple vortex second region and the central wheel-type flow region is quite complex and not well understood. However, precise knowledge of the characteristics of the flow in the transition region is not necessary to an understanding of the invention. The central core of the tube wherein "wheel-type" flow of the fluid occurs will be found to have a variable density gradient across it, providing a variable index of refraction across that region and producing the optical effect of a lens.

Ordinarily, an optical lens is constructed from a clear solid which has at least one face curved. This curvature provides the solid with a varying thickness across the face. Since the index of refraction is constant (or is supposed to be constant) throughout the solid, the differences in the effects on light rays passing through the different portions of the lens are achieved by the varying thickness of the material and the angle at which the rays strike the surface. Thus, light rays passing through the thicker portions of the lens are displaced more than are light rays passing through thinner portions of the lens.

The following, somewhat crude, analysis, though it contains some questionable assumptions, may aid those skilled in the field of fluid dynamics to obtain a better understanding of the lens effect. Considering the central region wherein wheel-type flow ocurs, one may designate angular or rotational velocity as $\omega$, pressure as $p$, density as $\rho$, and $r$ as the distance from the center of the tube to a ring having a radial thickness $dr$. Because the ring does not accelerate radially, the radial outward forces $\Sigma_{\text{out}}$ equal the radial inward forces $\Sigma_{\text{in}}$. The outward forces include pressure $p$ and centrifugal force, while the only inward force is pressure $p$. The pressure $p$ will be seen to act on an incremental area $dA$, which is equal to $rd\theta$, times the axial length along the tube of the flow being considered. Assuming the axial length to be unity, and the mass $m$ to equal density times volume, then $$dV = dA = rd\theta, \text{ and } m = \rho r(drd\theta)$$
$$p(rd\theta) + mr\omega^2 = (p+dp)(rd\theta)$$
$$p(rd\theta) + \rho r(drd\theta)r\omega^2 = (p+dp)(rd\theta)$$
$$pr(d\theta) + \rho r \omega^2 r dr(d\theta) = (p+dp)(rd\theta)$$
$$rd\theta(p + \rho r\omega^2 dr) = (p+dp)(rd\theta)$$
$$p + \rho \omega^2 r dr = p + dp$$
$$\rho r dr \omega^2 = dp$$

$$\frac{dp}{dr} = \rho r \omega^2 \tag{1}$$

From a well-known gas law, $dp = d\rho RT$; and from the above Equation 1

$$\frac{dp}{dr} = \rho r \omega^2$$

then $$\frac{RT d\rho}{dr} = \rho r \omega^2$$

$$\frac{d\rho}{dr} = \rho r \frac{\omega^2}{RT}$$

$$\frac{d\rho}{\rho} = (rdr) \frac{\omega^2}{RT} \tag{2}$$

since, $$\frac{d}{du} \log x = \frac{dx}{du} \bigg/ x = \frac{xdx}{du}$$

then, $$\frac{d}{d\rho}\log\rho = rdr\frac{\omega^2}{RT}$$

and $$\log\rho = \frac{r^2}{2}\frac{\omega^2}{RT} + k \quad (3)$$

where $k$ is a constant of integration. Taking $r=0$, then $\log\rho = k$. Therefore, when $r=0$, $k$ can be considered to be $\log\rho_a$. However, when fluid is injected at the wall of the tube, $r = r_o$, with a velocity of $\mu_o$, then $r_o\omega = \mu_o$, and $$\omega^2 = \frac{\mu_o^2}{r_o^2}$$

Taking the ratio of the density at any point on a radius with respect to the density at the center, $$\frac{\rho}{\rho_a} = \epsilon\frac{r^2\omega^2}{2RT}$$

where $\epsilon$ is an error facor, and the ratio of the densities at the tube with respect to the density at the center is $$\frac{\rho}{\rho_a} = \epsilon\frac{r^2}{2RT}\frac{\mu_o^2}{r_o^2} = \epsilon\frac{r^2}{r_o^2}\frac{\mu_o^2}{2RT} \quad (4)$$

The speed of sound $a$ is specified by: $a^2 = \gamma RT$, and the Mach number $$M = \frac{\mu}{a} \quad (')$$

(') Notes and Tables for Use in the Analysis of Supersonic Flow, Technical Note No. 1428, published by National Advisory Committee for Aeronautics, Washington, D.C. in December 1947. See particularly pp. 3–12.

Then, $$\frac{\rho}{\rho_a} = \epsilon\frac{r^2}{r_o^2}\frac{(M_oa)^2}{2RT} = \epsilon\frac{r^2}{r_o^2}\frac{M_o^2\gamma RT}{2RT} = \epsilon\frac{r^2}{r_o^2}\frac{\gamma}{2}M_o^2 \quad (5)$$

where $M_o$ is the injection Mach number, $\gamma$ is the ratio of specific heats $C_p/C_v$, and for air, $$\gamma = 1.4$$

When $M_o = 1$, for example, then $$\frac{\rho}{\rho_a} = \epsilon\frac{r^2}{r_o^2}\frac{\gamma}{2}$$

and, for air, $$\frac{\rho}{\rho_a} = \epsilon\frac{r^2}{r_o^2}0.7$$

or, $$\frac{\rho}{\rho_a} = 0.7\epsilon\frac{r_o^2}{r_o^2} \quad (6)$$

$$\rho_a = \frac{\rho_o}{0.7\epsilon}$$

or, approximating, $0.7\epsilon = 2$. Then the density $\rho_a$ at the center of the wheel-type region is about one-half of the density $\rho_o$ at the outer edge of that region.

The variation of the index of refraction of a gas with pressure and temperature has been shown to be as follows:

$$n_t - 1 = \frac{n_o - 1}{1 + at}\frac{p}{760} \quad (7)('')$$

('') Smithsonian Physical Tables, ninth revised edition, published by Smithsonian Institution, Washington, D.C. in 1956, publication 4169, Table 554 and notes, Index of Refraction of Gases and Vapors, p. 533.

where:

$n_t$ is the index of refraction for temperature $t$
$n_o$ is the index of refraction for temperature $t_o$
$a$ is the coefficient of expansion of the gas with temperature
$p$ is the pressure of the gas in millimeters of Hg Equation 7 may be rewritten as $$n_t = 1 + k_1 p = 1 + k_2$$

or, the index of refraction varies directly with pressure or density at a constant temperature, $k_1$ and $k_2$ being constants.

From the above, it can be seen that in a tube in which a fluid is rotating at a substantially high velocity, the index of refraction of the fluid near the center is lower than the index of refraction of the fluid adjacent the walls of the tube itself. This variation in the index of refraction across the diameter of the tube produces the effect of a curved surface in a lens.

It is an object of this invention to provide a new type of optical element.

It is another object of this invention to provide a new and improved optical element whose characteristics can readily be varied, at will.

It is still another object of this invention to provide a new and improved optical lens in which the refracting medium is a fluid.

It is still a further object of this invention to provide a new and improved optical element which utilizes a volume of a clear fluid placed in controlled motion to create the effects of a lens which is variable at will.

Other objects and advantages of this invention will become more apparent as the following description proceeds, which description should be considered together with the accompanying drawings, in which:

FIG. 1 is a perspective view, partially in section, of the basic instrument of this invention;

FIG. 2 is a sectional view of the device shown in FIG. 1 taken along line II—II;

FIG. 3 is a schematic showing of a common negative lens;

FIG. 4 is a schematic showing in section of the fluid effects in the system of this invention;

FIG. 5 is a partially sectional view of a cascaded system utilizing this invention;

FIG. 6 is another embodiment of a system utilizing the principle of this invention; and FIG. 7 is a schematic showing of a telescopic camera which could readily utilize this invention.

Referring now to the figures in detail and more particularly to FIGS. 1 and 2, the reference character 10 designates a tube or elongated cylinder which may be formed of any suitable material such as metal, glass, synthetic resin, and the like. A tube 16 of a diameter substantially smaller than that of tne tube 10 is connected tangentially with the interior of the tube 10. This is better shown in FIG. 2. Mounted within the tube 10 is a partition 12 having a generally central perforation 14. Connected to the other end of the tube 16 is a source 18 of fluid under pressure, such as a pump, a bottle of compressed gas, etc.

The device shown in FIGS. 1 and 2 is the basic form of the Ranque, or Hilsch, tube, and other forms are shown and explained in the U.S. Pat. 1,952,281 which was issued on Mar. 27, 1934, to G. J. Ranque. In operation, the device of FIGS. 1 and 2, as it is normally used, creates a circularly rotating, axially moving flow of fluid when fluid from the source 18 is tangentially injected into the tube 10 through the tube 16. Since a fluid is being injected into tube 10, that which is displaced moves freely towards the two ends, 10A and 10B, and is exhausted therefrom. The motion created by the injection of the fluid from the source 18 causes the fluid within the cylinder 10 to rotate circumferentially, creating centrifugal forces therein. This causes a compression of the fluid adjacent the walls of the cylinder 10 and an expansion of the fluid which lies on the axis or in the central portion of the cylinder 10. Accompanying the compression of the fluid is a heating effect, and accompanying the expansion of the fluid is a cooling effect. The partition 12 tends to prevent the flow of that fluid which is adjacent the cylinder 10 out through the end, 10B, of the cylinder. Thus, only the cooler fluid from the central portion of the cylinder 10 passes through the open orifice 14 and is exhausted from the end, 10B, and the warmer fluid adjacent the cylinder walls exhausts from the other end, 10A.

What has been described above is a normal operation of a Ranque "Vortex Tube." This device is useful for heating and also for cooling wherever there is a goodly source of compressed fluid, particularly gas, available.

However, it has been found that this device, due to the pressure gradient across the diameter of the tube 10, produces a variable index of refraction in the fluid, and the fluid contained in the cylinder 10 acts in the manner of a negative lens.

FIG. 3 illustrates, schematically, a normal negative lens which is formed of a clear solid 25. The lens shown in FIG. 3 has two concave surfaces 26 and 27. The two concave surfaces produce a solid which is thicker at its outer edges than it is in the center. Since light passing from the air into the lens 25, say at the surface 27, is bent more nearly parallel to the axis of the lens, a light ray is angularly displaced from the path it follows in air; those rays such as 29 which pass through the thicker portions of the lens 25 are farther displaced from their original paths than are rays such as 31 which pass through the thinner portion of the lens 25.

The schematic showing of FIG. 4, which is a portion of a cylinder 35 in which the fluid 38 contained therein has a variable density, gradually increasing from the center outward toward the walls of the cylinder 35, illustrates an effect similar to that produced by the negative lens 25 shown in FIG. 3. In FIG. 4, a light ray 36 is bent to a greater extent by the denser fluid contained in the cylinder 35 and is therefore displaced further from its original path than is light ray 37 which enters the cylinder 35 adjacent the fluid with a lower density. Thus, the variation of the density of the fluid contained in the cylinder 35 serves to produce the effects of a negative lens similar to that shown in FIG. 3. This phenomena is similar to that described in "Concepts of Classical Optics" by John Strong, published by W. H. Freeman and Company of San Francisco, in 1958, on pages 97 and 98 and shown in FIGS. 5–11. Mr. Strong therein described the effects of the varying densities of sodium vapor upon light being transmitted therethrough. Generally, a light ray is bent toward the portion with the higher index of refraction. Thus, in FIG. 4, the light ray 36 enters the tube 35 from the air and is bent toward the denser gas continually in a curve as shown. On the other hand, the light ray 37, which enters the tube 35 at a point where the index of refraction of the gas contained therein is substantially the same as that of the air, is bent in a curved manner also, and toward the portion of the gas having the higher index of refraction, but in a direction opposite from the bending of light ray 36.

The basic device shown in FIG. 1, and described in varying detail by means of FIGS. 2, 3 and 4, is shown in multiple form in FIG. 5. A single housing 21 contains a plurality of cavities 30, 31 and 32. Within the housing 21 are two partitions 33 and 34 each with its own centrally located orifice. At one end of the tube 21 is mounted a positive lens 20. A source 18 of gas under pressure supplies gas to the cavities 30 and 31 by means of supply tubes 39 and 40. A selectively variable valve 46 is mounted in the supply line 39, and a similar valve 47 is mounted in the supply line 40.

Each of the individual cavities 30, 31 and 32 operates in a manner similar to that described in connection with the device shown in FIGS. 1 and 2. Gas, or other compressible fluid, under pressure from the source 18 is supplied through the supply lines 39 and 40 in the amounts permitted by the particular settings of the valves 46 and 47. Since the gas enters the cavities 30 and 31 tangentrally located orifice. At one end of the tube 21 is lished within each of the cavities. In addition, since gas is supplied to the cavities 30 and 31, there is a longitudinal movement of the gas within the cavities 30 and 31 outward through the cavity 32. The centrifugal forces, as explained above, generated by the swirling gases compress the gas adjacent the walls of the housing 21 to create a medium which has a gradually increasing index of refraction as the axis outward from the housing 21. This, as explained above, creates a negative lens in cavity 30 and another negative lens in cavity 31. Since each of the supply lines 39 and 40 contains an adjustable valve 46 and 47, the rate at which the gas is supplied to the cavities 30 and 31 and the consequent rate of rotation of the gas in each of the cavities can be adjusted individually. This, then produces a separately operating negative lens in each of the cavities 30 and 31. In addition, the combination with the positive lens produces an optical system whose optical characteristics can readily be varied merely by controlling the valves 46 and 47.

One of the difficulties in a system such as that described in FIG. 5 is that as the magnification of a lens is changed, its effective center is also changed. Generally, when the lens is used alone, this makes little difference in the final result. However, when a lens of this nature is used in conjunction with other lenses, the other lenses very often focus their images upon the center of the variable lenses, and when the center of the variable lens is changed, the operation of the entire system is often undesirably affected. The apparatus shown in FIG. 6 shows one means for avoiding this defect. A hollow tube 41 having a gas supply tube 42 connected with the interior thereof also contains a telescoping portion. The end of the telescoping portion 43 may be moved to any of several positions, for example those shown by the dashed lines 44 and 45. Gas from a gas supply, such as the source 18 of FIGS. 1, 2 and 5, is applied tangentially to the interior of the housing 41 by means of the tube 42. As described above, this produces a swirling motion within the tube 41 and creates a gaseous vortex. The effect of the vortex is to compress the gas adjacent the tube 41 and expand the gas along the axis of the tube 41 to create a fluid medium having a gradually varying index of refraction across its section.

Generally, this type of device is symmetrical about its center. In other words, when looked at from ether end, the effects are the same. As the flow of gas through the tube 42 is varied to control the negative lens effect produced in the apparatus shown in FIG. 6, the member 43 can be telescoped in or out of the tube 41. This, in effect, changes the length of one end of the tube and causes the center, or what can be considered the effective center, of the negative lens created in the tube 41 to move. Thus, when an adjustable negative lens of this type is used in combination with other lens systems such as that shown in FIG. 5, the telescoping portion 43 can readily be coupled, by mechanical, electrical, or pneumatic means, for example, to the valve in the supply line 42 which controls the gas supply to the interior of the housing 41. This will then modify not only the magnification or power of the lens produced in the tube 41, but will also modify the effective center of that lens.

In FIG. 7, a camera having a Galilean telescope lens system mounted thereon is shown. In this camera, the objective lens 51 is shown at one end of the telescope lens tube 54. A negative lens 52 is contained in the other end of the tube 54 between the objective lens 51 and the camera lens system 55. The camera housing 53 is shown containing a film strip 56.

The theory of the Galilean telescope is not new and its explanation need not be discussed in detail herein. A description of this telescope can be found on pages 338 and 339 in "Concepts of Classical Optics," mentioned above.

However, the system of FIG. 7 is shown to illustrate the fact that a negative lens of the type shown in FIGS. 1, 2, 5 and 6 above can be used in a system of this sort substituted for the negative lens 52. In operation, the power of the negative lens according to this invention could be varied to vary the overall effect of the telescope 54 and its operation in connection with the camera 53.

What is claimed is:

1. The method of focusing a beam of ultrahigh frequency electromagnetic wave energy comprising:
   (a) providing a body of transparent fluid radially enclosed by a hollow cylindrical tube;
   (b) injecting additional fluid tangentially into said tube to create a vortex flow of said fluid of substantial velocity about the axis of said tube, thereby creating a density gradient substantially concentric about said axis in a plane passing radially through said tube; and
   (c) directing said beam through said tube along an axis substantially normal to said plane.

2. The invention according to claim 1 and further including the step of selectively changing the rotational velocity of said vortex flow, thereby changing said density and refractive index gradients.

3. The invention according to claim 1 wherein axial flow of said fluid through said tube is more restricted in one direction from the point of tangential injection thereof than in the other direction.

4. The invention according to claim 3 wherein said axial flow is more restricted in said one direction by placing within said tube a radial partition having a centrally disposed opening.

5. A fluid lens for focusing a beam of ultrahigh frequency electromagnetic wave energy comprising:
   (a) a hollow, elongated, cylindrical tube;
   (b) a body of transparent fluid radially enclosed by said tube;
   (c) means for injecting additional fluid at a substantial velocity tangentially into said tube to create a vortex flow of said fluid of substantial velocity about the axis of said tube, whereby the centrifugal forces generated within said fluid create a density gradient, and thereby a refractive index gradient, substantially concentric about said axis; and
   (d) means for directing said beam through said tube along said axis.

6. The invention according to claim 5 and further including means for selectively controlling the velocity of injection of said gas into said tube, thereby controlling said density and refractive index gradients.

7. The invention according to claim 5 wherein the additional fluid tangentially injected into said tube is the same as said body of transparent fluid.

8. The invention according to claim 5 and further including a radial partition within said tube having a central opening of substantially smaller diameter than the inside diameter of said tube.

9. The invention according to claim 8 wherein said partition is closely adjacent the point where said fluid is tangentially injected into said tube.

References Cited

UNITED STATES PATENTS

| | | | |
|---|---|---|---|
| 3,355,235 | 11/1967 | Berreman | 350—180 |
| 3,410,627 | 11/1968 | Berreman et al. | 350—179 |
| 3,415,588 | 12/1968 | Berreman | 350—96 |

OTHER REFERENCES

Beck: "Gas Mixture Lens Measurements," The Bell System Technical Journal, vol. XLIII, No. 4, part 2, pp. 1821–1825, July 1964.

Berreman: "A Lens or Light Guide Using Convectively Distorted Thermal Gradients in Gases," The Bell System Technical Journal, vol. XLIII, No. 4, July 1964, pp. 1469–1475.

JOHN K. CORBIN, Primary Examiner

U.S. Cl. X.R.

350—160